United States Patent
Yoon et al.

(10) Patent No.: US 9,458,525 B2
(45) Date of Patent: Oct. 4, 2016

(54) METHOD OF RECOVERING RARE EARTH ELEMENTS FROM OXIDIZED SCRAP OF PERMANENT MAGNET

(71) Applicant: KOREA INSTITUTE OF GEOSCIENCE AND MINERAL RESOURCES, Daejeon (KR)

(72) Inventors: Ho-Sung Yoon, Seoul (KR); Chul-Joo Kim, Daejeon (KR); Kyeong-Woo Chung, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 98 days.

(21) Appl. No.: 14/286,644

(22) Filed: May 23, 2014

(65) Prior Publication Data

US 2015/0122084 A1    May 7, 2015

(30) Foreign Application Priority Data

Nov. 6, 2013    (KR) .................. 10-2013-0134295

(51) Int. Cl.
| | |
|---|---|
| C22B 59/00 | (2006.01) |
| C22B 3/08 | (2006.01) |
| C22B 3/44 | (2006.01) |
| C22B 7/00 | (2006.01) |

(52) U.S. Cl.
CPC ............... C22B 59/00 (2013.01); C22B 3/08 (2013.01); C22B 3/44 (2013.01); C22B 7/007 (2013.01); Y02P 10/234 (2015.11)

(58) Field of Classification Search
CPC ........... C22B 59/00; C22B 3/08; C22B 3/44; C22B 7/007
See application file for complete search history.

(56) References Cited

FOREIGN PATENT DOCUMENTS

| | | |
|---|---|---|
| JP | 62-083433 A | 4/1987 |
| JP | 11-50168 | 2/1999 |
| JP | 2007-231379 | 9/2007 |
| JP | 2011-184735 A | 9/2011 |
| JP | 2012-167345 | 9/2012 |
| KR | 10-1183579 | 9/2012 |
| WO | WO 2012/140998 A1 | 10/2012 |

OTHER PUBLICATIONS

Asano et al. JP 2012-229483 A published Nov. 22, 2012. Machine translation of the description.*
Asano et al. Derwent publication ACC-No. 2012-N25185 for the patent family including WO 2012-140998 A1 published Oct. 18, 2012.*
Japanese Office action with English Translation for Japanese Application No. P2014-043091, issued Nov. 17, 2014, 8 pages.
Japanese Notice of Allowance with English translation for Application No. 2014-043091, dated Mar. 24, 2015, 8 pages.

* cited by examiner

Primary Examiner — George Wyszomierski
Assistant Examiner — Tima M McGuthry Banks
(74) Attorney, Agent, or Firm — Lewis Roca Rothberger Christie LLP (57) ABSTRACT

Disclosed is a method of recovering a rare earth element from oxidized scrap of permanent magnet. The method includes leaching an oxidized scrap of a permanent magnet from a sulfuric acid solution, and recovering the rare earth element after precipitating the rare earth element contained in the oxidized scrap of the permanent magnet by adding sodium sulfate into the sulfuric acid solution.

3 Claims, 13 Drawing Sheets

METHOD OF RECOVERING RARE EARTH ELEMENTS FROM OXIDIZED SCRAP OF PERMANENT MAGNET

CROSS-REFERENCE TO RELATED APPLICATION

This application claims priority to Korean Patent Application No. 10-2013-0134295 filed on Nov. 6, 2013, and all the benefits accruing therefrom under 35 U.S.C. §119, the contents of which is incorporated by reference in its entirety.

BACKGROUND OF THE INVENTION

1) Field of the invention

The present invention relates to a method of recovering rare earth elements from oxidized scrap of a permanent magnet.

2) Background of Related Art

Rare earth magnets have been extensively used in various fields from typical home appliances to peripheral terminals of large-sized computers or medical instruments. The rare earth magnet is one of significant important electronic materials to realize advanced technologies. Recently, as computers or telecommunication appliances are realized in small size and light weight, the rare earth magnet has been realized with high precision in small size. In addition, as the use of the rare earth magnet is enlarged, the demand for the rare earth magnet is rapidly increased.

In general, after the rare earth magnet is molded and sintered in predetermined size, the rare earth magnet is formed in predetermined size and shape through a mechanical machining process or a grinding process and the surface treatment process such as a plating process or a painting process is performed with respect to the rare earth magnet, so that the rare earth magnet is realized as a product. The weights of scraps, such as molding exposure powders, a sintering characteristic defective product, a machining defective product, or a plating defective product, made during the above processes occupy several tens of percentages of the weight of an original source material, and sludge (machining or grinding fragments) generated during the mechanical process or the grinding process approximates several tens of percentages of a product source material. Therefore, the recovering or recycling process of rare earth elements from the rare earth scraps and sludge is extremely important to save resources, reduce industrial waste, and lower the price of the rare earth magnet.

According to the related art, in order to extract neodymium (Nd) from the rare earth magnet, various schemes such as an elution scheme, a chromatography scheme, a precipitation scheme, and a solvent extraction scheme have been attempted. However, only the minimum of Nd is extracted or Nd is extracted at a low rate, so that Nd may not be used in recycling industries.

As the related art, there is provided Korea Patent Registration No. 10-1183579 (issued on Sep. 17, 2012) titled "High Efficient Nd Leaching Method using Ultrasonic Wave".

SUMMARY OF THE INVENTION

The present invention is to provide a method of recovering rare earth elements from oxidized scrap of a permanent magnet at a high recovery rate.

The present invention suggests several objects without limitation to the above objects, and other objects, which are not described, can be clearly comprehended from the following description by those skilled in the art.

In order to accomplish the above objective, there is provided a method of recovering a rare earth element from an oxidized scrap of a permanent magnet. The method includes leaching the oxidized scrap of the permanent magnet from a sulfuric acid solution, and recovering the rare earth element after precipitating the rare earth element contained in the oxidized scrap of the permanent magnet by adding sodium sulfate into the sulfuric acid solution.

The oxidized scrap of the permanent magnet includes neodymium.

The sulfuric acid solution has sulfuric acid concentration in a range of 0.05 M to 2.6 M.

A content of the sodium sulfate contained in the sulfuric acid solution is in a range of 1.88 equivalent weights to 2.00 equivalent weights.

A reaction temperature in a range of 50° C. to 60° C. and a reaction time of three hours are maintained when the sodium sulfate is added.

In addition, there is provided a method of recovering a rare earth element from an oxidized scrap of a permanent magnet. The method includes leaching an oxidized scrap of a permanent magnet containing neodymium and dysprosium in a sulfuric acid solution, adjusting a weight ratio (Dy/Dy+Nd) of the leached neodymium and dysprosium existing in the sulfuric acid solution to 0.16, and recovering the neodymium and the dysprosium after precipitating the neodymium and the dysprosium by adding sodium sulfate into the sulfuric acid solution.

The sulfuric acid solution has sulfuric acid concentration in a range of 0.05 M to 2.6 M.

A content of the neodymium leached in the sulfuric acid solution is 2.3% by weight or more.

An amount of the sodium sulfate added into the sulfuric acid solution is 3.5 equivalent weights.

A reaction temperature is 60° C. and a reaction time is three hours in the leaching.

As described above, according to the present invention, the rare earth elements contained in the oxidized scrap of the permanent magnet can be simply recovered, so that the process efficiency can be improved, and costs can be lowered.

In addition, neodymium contained in the oxidized scrap of the permanent magnet can be recovered at a high recovery rate of at least 99% by using only sulfuric acid and sodium sulfate. Further, dysprosium can be recovered from a leaching solution having the oxidized scrap of the permanent magnet at the recovery rate of at least 98% by adjusting the content ratio of neodymium (Nd) and dysprosium (Dy) among rare earth elements.

DETAILED DESCRIPTION OF THE INVENTION

Hereinafter, an exemplary embodiment of the present invention will be described in detail with reference to accompanying drawings.

The advantages, the features, and schemes of achieving the advantages and features of the present invention will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims In addition, the detailed descriptions of well-known techniques incorporated herein may be omitted when they make the subject matter rather unclear.

The present invention provides a method of recovering rare earth elements from oxidized scrap of a permanent magnet including steps of leaching the oxidized scrap of the permanent magnet from a sulfuric acid solution, and precipitating the rare earth elements contained in the oxidized scrap of the permanent magnet by adding sodium sulfate into a sulfuric acid solution and then recovering the rare earth elements.

According to the method of recovering the rare earth elements of the present invention, since the rare earth elements contained in the oxidized scrap of the permanent magnet can be recovered at a high ratio by using the sulfuric acid solution and the sodium sulfate, the process efficiency can be improved, and the rare earth elements can be recovered at low costs.

Figure 1:
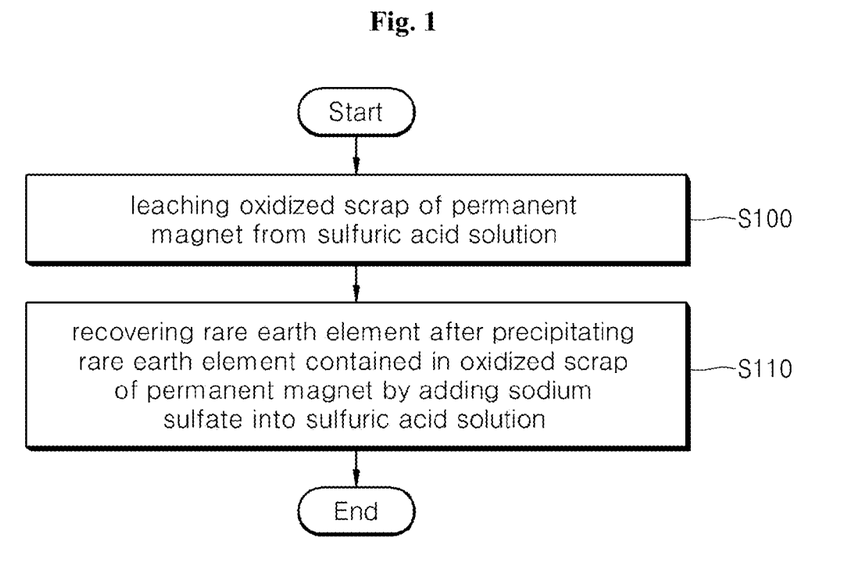
FIG. 1 is a flowchart showing a method of recovering rare earth elements from oxidized scrap of a permanent magnet according to one embodiment of the present invention.

FIG. 1 is a flowchart showing a method of recovering rare earth elements from oxidized scrap of a permanent magnet according to one embodiment of the present invention. Hereinafter, the present invention will be described in detail with reference to FIGS. 1 and 2.

The method of recovering the rare earth elements from the oxidized scrap of the permanent magnet according to the present invention includes a step of leaching the oxidized scrap of the permanent magnet from the sulfuric acid solution (step S100).

The oxidized scrap of the permanent magnet according to the present invention includes neodymium (Nd). In order to recover Nd, the sulfuric acid solution is added to the oxidized scrap of the permanent magnet to leach Nd contained in the oxidized scrap of the permanent magnet.

In this case, the concentration of sulfuric acid contained in the sulfuric acid solution is preferably in the range of 0.05 M to 2.6 M. If the concentration of the sulfuric acid is less than 0.05 M, the recovery rate of Nd may be lowered. If the concentration of the sulfuric acid exceeds 2.6 M, the recovery rate of Nd may not be increased any more. Accordingly, the concentration of the sulfuric acid is preferably 2.6 M or less.

Next, the method of recovering the rare earth elements from the oxidized scrap of the permanent magnet according to the present invention includes precipitating the rare earth elements contained in the oxidized scrap of the permanent magnet by adding sodium sulfate into the sulfuric acid solution and then recovering the rare earth elements (step S110).

According to the method of recovering the rare earth elements from the oxidized scrap of the permanent magnet of the present invention, the content of sodium sulfate existing in the sulfuric acid is preferably in the range of 1.88 equivalent weights to 2.00 equivalent weights. If the content of the sodium sulfate is less than 1.88 equivalent weights, the recovery rate of Nd may be lowered. If the content of the sulfuric acid exceeds 2.00 equivalent weights, the recovery rate of Nd may not be increased any more. Accordingly, the content of the sodium sulfate is preferably 2.00 equivalent weights in terms of process efficiency.

In addition, preferably, when the sodium sulfate is added, the reaction temperature is in the range of 50° C. to 60° C., and the reaction time of three hours is required. If the reaction temperature is less than 50° C., the recovery rate of Nd may be lowered to 90% or less. If the reaction temperature exceeds 60° C., Nd may not be recovered any more. Accordingly, the reaction temperature is 60° C. or less in terms of energy saving related to the process efficiency (see FIG. 5).

The present invention provides a method of recovering rare earth elements from oxidized scrap of a permanent magnet steps of including leaching the oxidized scrap of the permanent magnet containing Nd and dysprosium (Dy) from a sulfuric acid solution, adjusting the weight ratio (Dy/Dy+ Nd) of leached Nd and Dy existing in the sulfuric acid solution to 0.16, and recovering Nd and Dy after precipitating Nd and Dy by adding the sodium sulfate into the sulfuric acid solution.

Figure 2:
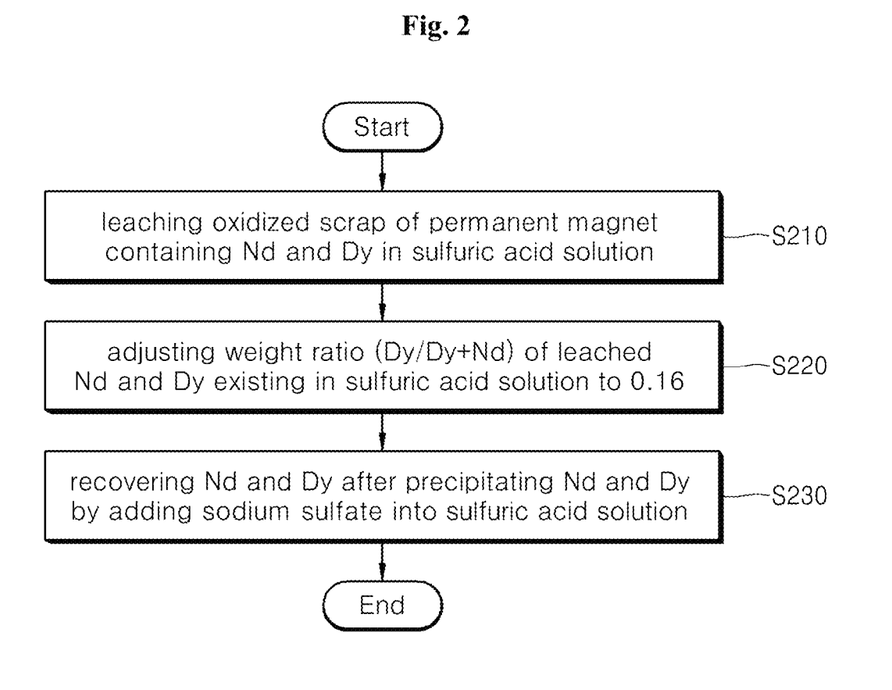
FIG. 2 is a flowchart showing a method of recovering rare earth elements from oxidized scrap of a permanent magnet according to another embodiment of the present invention.

FIG. 2 is a flowchart showing a method of recovering rare earth elements from oxidized scrap of a permanent magnet according to another embodiment of the present invention.

Referring to FIG. 2, the method of recovering the rare earth elements from the oxidized scrap of the permanent magnet according to the present invention includes the step of leaching the oxidized scrap of the permanent magnet containing Nd and Dy from the sulfuric acid solution (step S200).

The oxidized scrap of the permanent magnet contains Nd and Dy, and the rare earth elements contained in the oxidized scrap of the permanent magnet are leached in the sulfuric acid solution. In this case, the concentration of the sulfuric acid in the sulfuric acid solution is preferably in the range of 0.05 M to 2.6 M.

Subsequently, the method of recovering the rare earth elements from the oxidized scrap of the permanent magnet according to the present invention includes the step of adjusting the weight ratio (Dy/Dy+Nd) of leached Nd and Dy existing in the sulfuric acid solution to 0.16

After Nd and Dy contained in the oxidized scrap of the permanent magnet have been leached in the sulfuric acid solution, the weight ratio (Dy/Dy+Nd) of Nd and Dy contained in the sulfuric acid solution is adjusted to 0.16. In this state, the content of Nd existing in the leaching solution is adjusted, thereby improving the recovery rate of Dy. In order to adjust the weight ratio of Nd and Dy, oxidized scrap of the permanent magnet may be additionally contained in the sulfuric acid solution.

In this case, preferably, the content of leached Nd existing in the sulfuric acid solution is 2.3% by weight or more. If the content of the leached Nd is less than 2.3% by weight, the recovery rate of Dy may be degraded (see FIG. 8).

The method of recovering the rare earth elements from the oxidized scrap of the permanent magnet according to the present invention includes the step of recovering Nd and Dy after precipitating Nd and Dy by adding the sodium sulfate into the sulfuric acid to recover Nd and Dy (step S220).

In this case, Nd and Dy leached in the sulfuric acid solution react with sodium sulfate so that ND and Dy are precipitated in the form of double sulfates as shown in reaction formulas 1 and 2.

$Nd_2(SO_4)_3 + Na_2SO_4 \rightarrow Nd \cdot Na(SO_4)_2 \downarrow$     [Reaction Formula 1]

$Dy_2(SO_4)_3 + Na_2SO_4 \rightarrow Dy \cdot Na(SO_4)_2 \downarrow$     [Reaction Formula 2]

In this case, preferably, the content of sodium sulfate added into the sulfuric acid solution is 3.5 equivalent weights. If the content of sodium sulfate added into the sulfuric acid solution corresponds to 3.5 equivalent weights, 2.0 equivalent weights of sodium sulfate in 3.5 equivalent weights of sodium sulfate are used to precipitate Nd contained in the oxidized scrap of the permanent magnet, and remaining 1.5 equivalent weight is used to precipitate Dy (see Experimental Example 5).

Preferably, the leaching work is performed at the reaction temperature of 60° C. and the reaction time of three hours. Referring to experimental example 6 related to the reaction temperature, the leaching work is performed at the reaction temperature of 60° C. for the reaction time of three hours, so that 99.5% of the Nd recovery rate and 98% of the Dy recovery rate can be obtained.

Embodiment 1: Recovery of Neodymium (Nd)

Figure 3:
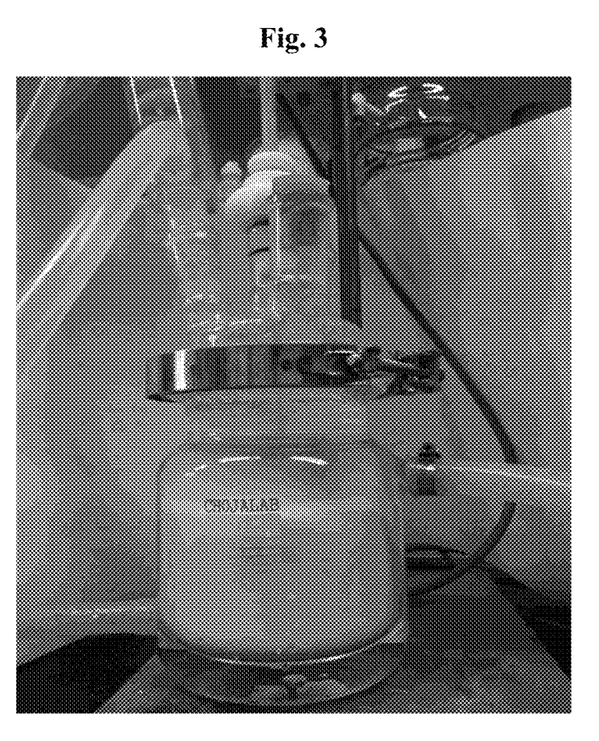
FIG. 3 is a view showing a precipitation reaction of double sulfates of a rare earth element and sodium in the method of recovering rare earth elements from the oxidized scrap of the permanent magnet according to the present invention.

Oxidized scrap of a permanent magnet containing Nd was leached in a sulfuric acid solution. In this case, 1.41% by weight of Nd was leached in the sulfuric acid solution. After introducing 300 ml of the leaching solution (sulfuric acid solution) having Nd leached therein into a precipitation reactor having a condenser attached thereto, the leaching solution was heated at the temperature of 60° C. In this case, the temperature control was performed in a water bath. After the temperature had reached 60° C., two equivalent weights of sodium sulfate was added to the result so that Nd was precipitated in the form of double sulfates of Nd and Na to recover Nd (see FIG. 3). The recovery rate of Nd was found by analyzing an Nd component in a filtrate through an Inductively Coupled Plasma Atomic Emission Spectroscopy (ICP-AES) scheme.

Embodiment 2: Recovery of Nd and Dy

Nd and Dy were recovered in the same manner as that of the first embodiment except that oxidized scrap of the permanent magnet containing Nd and Dy was leached in the sulfuric acid solution and 3.5 equivalent weights of sodium sulfate were added to the result. The content ratio (Dy/(Dy+Nd)) of Nd and Dy leached in the sulfuric acid solution was 0.16, and the contents of Nd and Dy were 2.3% by weight and 0.45% by weight, respectively.

COMPARATIVE EXAMPLE

Recovery of Dy from Sulfuric acid Solution Containing Only Dy

Figure 7:
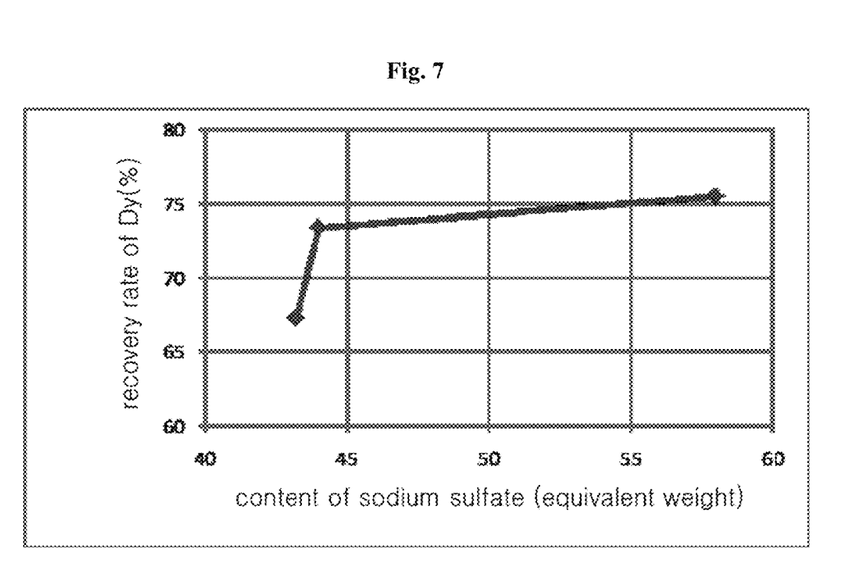
FIG. 7 is a graph showing a recovery rate of Dy as a function of the content of the sodium sulfate when only Dy exists in a sulfuric acid solution.

A Dy sulfuric acid solution, in which the sulfuric acid solution contains 0.49% by weight of Dy, was prepared for the use as a starting solution by precipitating 6.7 g of Dy into 1 L of the sulfuric acid solution having the concentration of 2.5 M. Sodium sulfate was added under the condition of the reaction temperature of 60° C. and the reaction time of three hours. When comparing with the recovery rate of Nd, the recovery rate of Dy was represented by less than 70% in the case that only Dy exists in the sulfuric acid solution. In order to precipitate double sulfates by adding sodium sulfate, a significantly excessive amount of sodium sulfate must be precipitated (at least 40 equivalent weights of sodium sulfate as compared with the content of Dy). Accordingly, Dy—Na double sulfates in the sulfuric acid solution by the sodium sulfate represent a significantly-low precipitation rate (see FIG. 7).

EXPERIMENTAL EXAMPLE 1

Analysis of Recovery Rate of Nd Depending on Content of Sodium Sulfate

Figure 4:
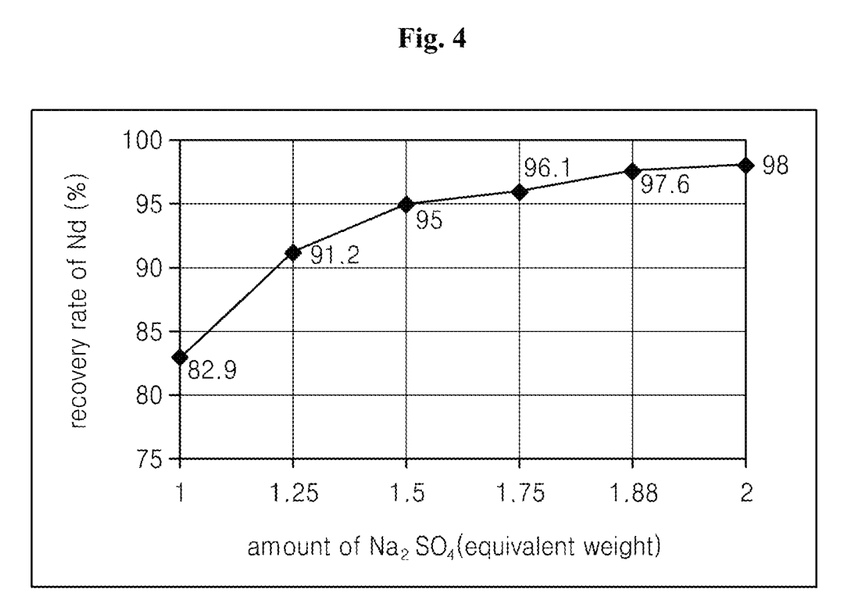
FIG. 4 is a graph showing a recovery rate of Nd as a function of a content of a sodium sulfate in a first embodiment of the present invention.

The recovery rate of Nd was analyzed depending on the content of sodium sulfate in the first embodiment of the present invention, and the result is shown in FIG. 4.

As shown in FIG. 4, the recovery rate of Nd was increased as the content of sodium sulfate was increased, and reached up to 98% when 2.0 equivalent weights of sodium sulfate were added.

EXPERIMENTAL EXAMPLE 2

Figure 5:
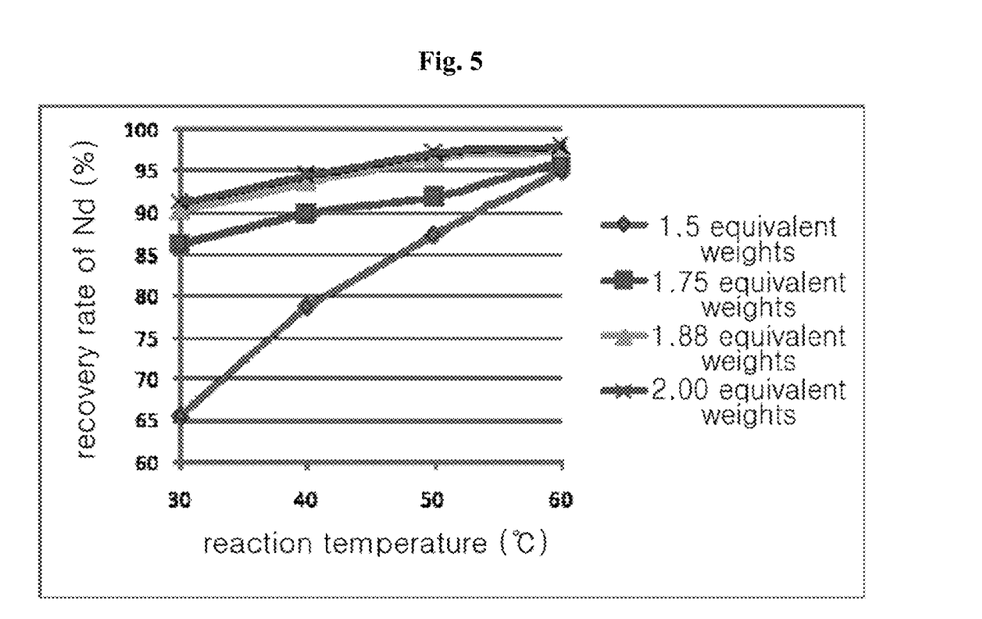
FIG. 5 is a graph showing a recovery rate of Nd as a function of a reaction temperature and the content of the sodium sulfate in the first embodiment of the present invention.

Analysis of Recovery Rate of Nd Depending on Reaction Temperature and Content of Sodium Sulfate The recovery rate of Nd was analyzed depending on the reaction temperature and the content of sodium sulfate in the first embodiment of the present invention, and the result is shown in FIG. 5.

As shown in FIG. 5, the recovery rate of Nd was increased as the reaction temperature and the content of sodium sulfate were increased. However, as the content of the sodium sulfate was increased, the influence exerted by the reaction temperature was reduced. In other words, the recovery rate of Nd was sharply increased depending on the increase of the reaction temperature at 1.5 equivalent weights of sodium sulfate, but the increase range in the recovery rate of Nd depending on the reaction temperature was slightly reduced at 1.7 equivalent weights of sodium sulfate.

EXPERIMENTAL EXAMPLE 3

Figure 6:
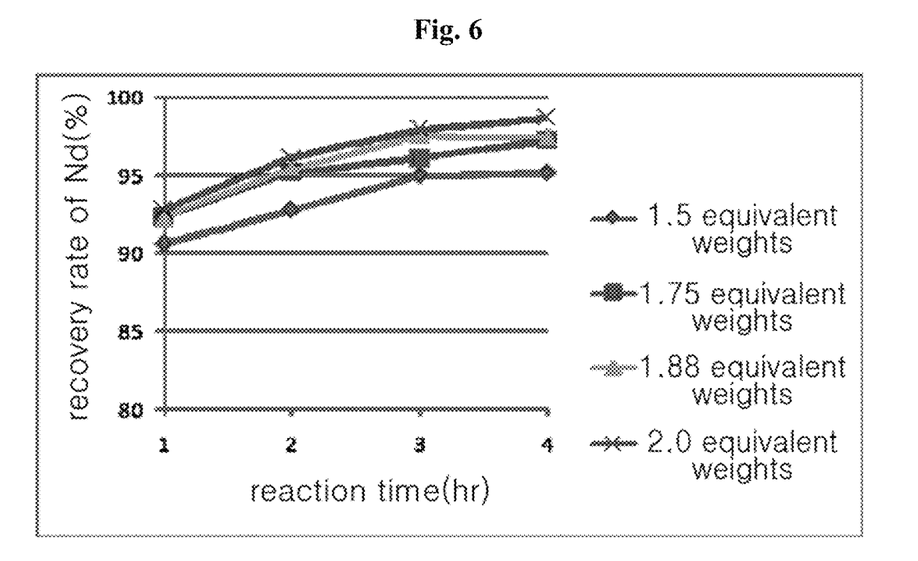
FIG. 6 is a graph showing a recovery rate of Nd as a function of a reaction time and the content of the sodium sulfate in the first embodiment of the present invention.

Analysis of Recovery Rate of Nd Depending on Reaction Time and Content of Sodium Sulfate The recovery rate of Nd was analyzed depending on the reaction time and the content of sodium sulfate in the first embodiment of the present invention, and the result is shown in FIG. 6.

As shown in FIG. 6, according to the first embodiment, the recovery rate of Nd was increased as the reaction time was increased at the reaction temperature of 60 ° C., and approximately represented regardless of variation in the content of sodium sulfate. After the reaction time of three hours, the increase range in the recovery rate of Nd became slow down.

Therefore, according to the experimental result described above, it is preferred that 2.0 equivalent weights of sodium sulfate was required, the reaction temperature was in the range of 50° C. to 60° C., and the reaction time of three hours was required in order to obtain the recovery rate of Nd to 98% or more.

EXPERIMENTAL EXAMPLE 4

Figure 8:
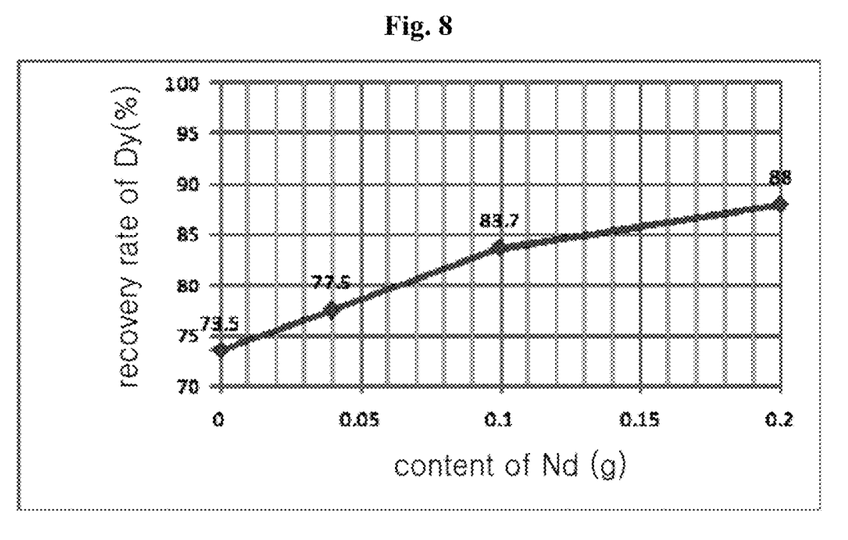
FIG. 8 is a graph showing a recovery rate of Dy as a function of the content of Nd existing in a sulfuric acid solution in a second embodiment of the present invention.

Analysis of Recovery Rate of Nd Depending on Content of Nd in Sulfuric Acid Solution The recovery rate of Dy was analyzed depending on the content of Nd in the sulfuric acid solution in the second embodiment of the present invention, and the result was shown in FIG. 8.

As shown in FIG. 8, if a slight amount of Nd exists in the sulfuric acid solution containing Dy (0.7 g of Dy), the recovery rate of Dy is increased due to the precipitation of double sulfates. In this case, the recovery rate of Dy is 73.7% when the content of Nd is 0 g, and the recovery rate of Dy is 88% when the content of Nd is 0.2 g. Accordingly, when comparing with the case that only Dy is dissolved in the sulfuric acid solution, the double sulfates of Dy is more precipitated in the case that Nd is dissolved in the sulfuric acid solution together with Dy. If the content of Nd is increased, the precipitation rate of the double sulfates of Dy is increased. Accordingly, if Nd exists in the sulfuric acid solution, the reactivity with the sodium sulfate is improved, so that the Nd is immediately precipitated in the form of double sulfates. Accordingly, it is determined that a solid-liquid interface between the Nd—Na double sulfates existing in the sulfuric acid solution and the sulfuric acid solution accelerate the precipitation reaction of the Dy—Na double sulfates.

In order to analyze the behavior of the double sulfate precipitation in the sulfuric acid solution, in which both of Nd and Dy are dissolved, based on the above result, a sulfuric acid solution containing 1.2% by weight of Nd and a sulfuric acid solution containing 1.2% by weight of Dy were prepared and mixed at the proper ratio. After performing the double sulfate precipitation while varying the contents of Dy and Nd in the mixed solution under the condition of 3.5 equivalent weights of sodium sulfate, the reaction temperature of 60° C., and the reaction time of three hours, the recovery rates of Dy and Nd were analyzed in the double sulfate precipitation reaction, and the result is shown in FIG. 9.

Figure 9:
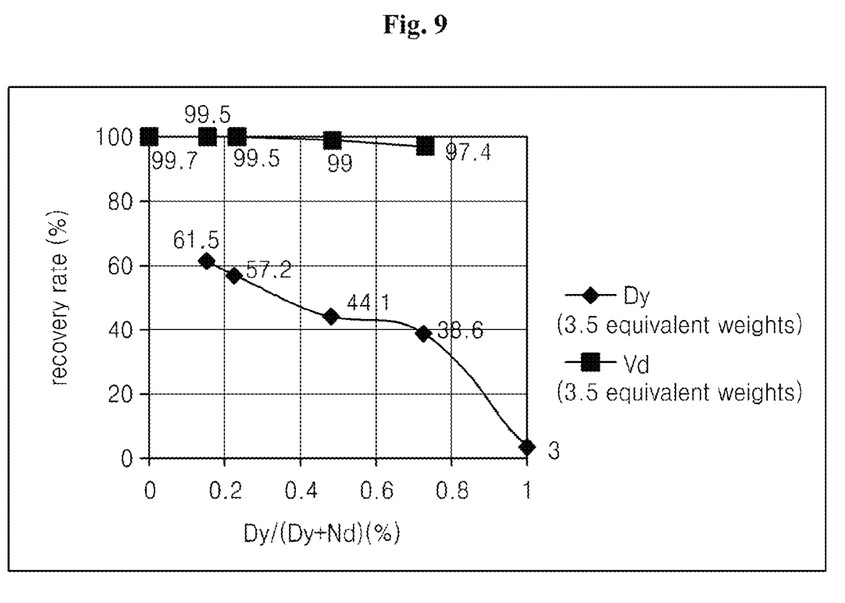
FIG. 9 is a graph showing the recovery rates of Nd and Dy in a double sulfate precipitation reaction after performing the double sulfate precipitation reaction while varying the contents of Nd and Dy in a mixed solution under the condition of 3.5 equivalent weights of sodium sulfate, the reaction temperature of 60° C., and the reaction time of three hours.

As shown in FIG. 9, as the content of Nd was increased in a sulfuric acid solution, the recovery rate of Dy was increased. When Nd was precipitated in the form of double sulfates, about two equivalent weights of sodium sulfate was required. In this case, the recovery rate of double sulfates was represented as 99% or more. Therefore, it is determined that sodium sulfate was required by 2.0 equivalent weights of 3.5 equivalent weights for Nd double sulfate precipitation, and remaining 1.5 equivalent weights of sodium sulfate were used for Dy double sulfate precipitation.

When 3.5 equivalent weights of sodium sulfate were added with respect to the content of rare earth elements, as the content of Dy was decreased in the sulfuric acid solution, that is, the content of Nd was increased, an amount of sodium sulfate participating in the Dy double sulfate precipitation was increased (an excessive amount of sodium sulfate was added into the Nd double sulfate precipitation), so that the recovery rate of Dy was increased through the double sulfate precipitation.

EXPERIMENTAL EXAMPLE 5

Figure 10:
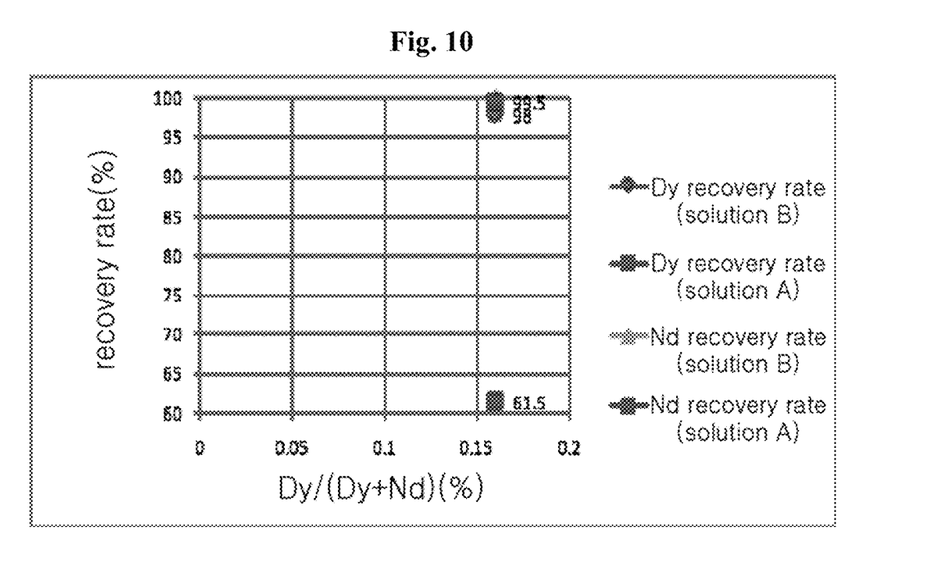
FIG. 10 is a graph showing the recovery rate of Nd and Dy as a function of the contents of Nd and Dy existing in a sulfuric acid solution in the second embodiment of the present invention.

Analysis of Recovery Rate of Dy Depending on Contents of Dy and Nd in Sulfuric Acid Solution The double sulfate precipitation reactions were analyzed in sulfuric acid solutions equal to each other in the ratio of Dy to Nd and different from each other in the contents of Nd and Dy according to the second embodiment of the present invention, and the result is shown in FIG. 10.

Solutions A and B in FIG. 10 are expressed as follows, and solution B is a sulfuric acid solution obtained by leaching oxidized scrap of a permanent magnet by sulfuric acid.

Solution A: Dy+Nd=1.20% by weight, Dy/(Dy+Nd)=0.16
Solution B: Dy+Nd=2.74% by weight, Dy/(Dy+Nd)=0.16

As shown in FIG. 10, the recovery rate of Dy depending on the double sulfate precipitation is sharply increased as the content of a rare earth element in the sulfuric acid having a constant weight fraction of Dy is increased, because remaining equivalent weights of 3.5 equivalent weights of the sodium sulfate, which is added depending on the content of Nd existing in the sulfuric acid solution described above, participates in the Dy double sulfate precipitation reaction. In particular, when Nd leached in the sulfuric acid solutions was 2.3% by weight or more, the recovery rates of Nd and Dy were increased, and the recovery rate of Nd is represented as 99% or more in all sulfuric acid solutions. Therefore, the increase in the content of Nd in the sulfuric acid solutions may be increase the Dy double sulfate precipitation rate.

EXPERIMENTAL EXAMPLE 6

Figure 11:
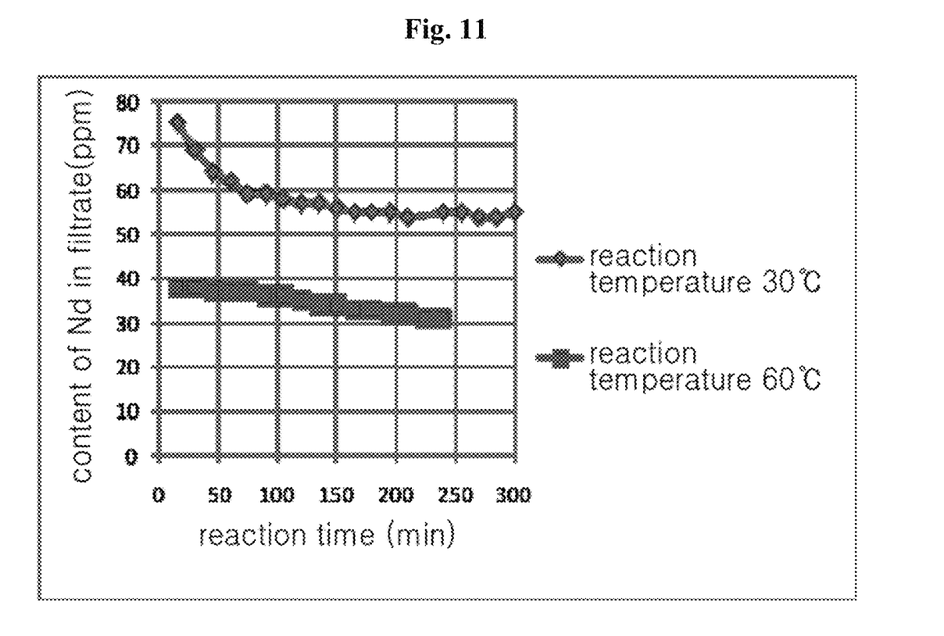
FIG. 11 is a graph showing the recovery rate of Nd as a function of the reaction temperature and the reaction time in the second embodiment of the present invention.
Figure 12:
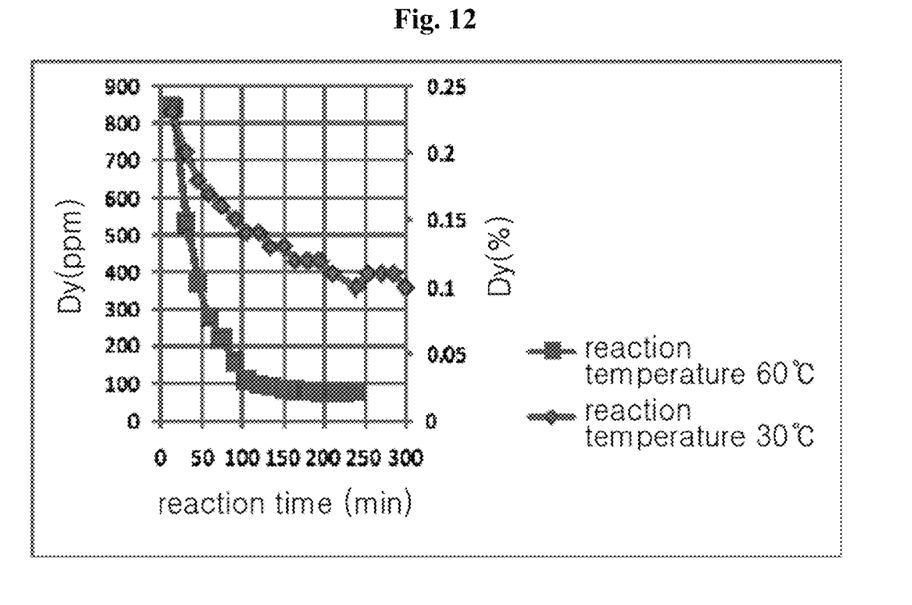
FIG. 12 is a graph showing the recovery rate of Dy as a function of the reaction temperature and the reaction time in the second embodiment of the present invention.

Analysis of Recovery Rates of Nd and Dy Depending on Reaction Temperature and Reaction Time The recovery rates of Nd and Dy depending on the reaction temperature and the reaction time in the second embodiment of the present invention were analyzed, and the results are shown in FIGS. 11 and 12.

As shown in FIG. 11, the recovery rate of Nd in 3.5 equivalent weight of sodium sulfate is represented as 99% or more regardless of reaction time. Particularly, Nd is recovered by 99.9% at the reaction temperature of 60 ° C. in an initial reaction stage.

In addition, as shown in FIG. 12, the recovery rate of Dy is 79% under the condition of the reaction temperature of 30° C. and the reaction time of 300 minutes, and 98.4% after the reaction time 120 minutes at the reaction temperature of 60° C. As described above, the reaction temperature exerts a significant influence on the recovery rate of Dy in the double sulfate precipitation of Dy because the solubility of the Dy—Na double sulfates may be significantly reduced according to the increase of the temperature of the sulfuric acid solution. Therefore, the reaction temperature is an important parameter to increase the recovery rate of Dy through the double sulfate precipitation, and 3.5 equivalent weights of the sodium sulfate is prefer at the reaction temperature of 60° C. and the reaction time of two hours to three hours.

Figure 13:
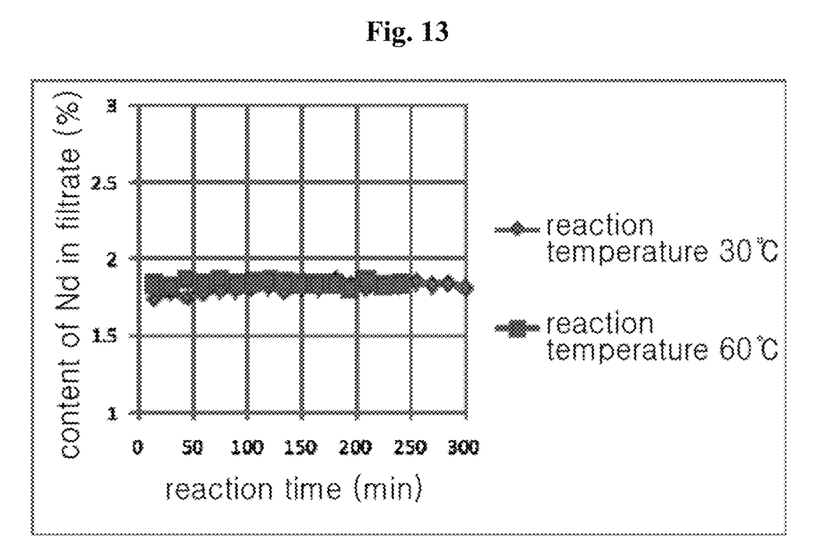
FIG. 13 is a graph showing the variation in the content of Fe existing in the sulfuric acid solution as a function of the reaction time.

FIG. 13 is a graph showing the variation in the content of Fe contained in the sulfuric acid solution depending on the reaction time. The content of Fe is rarely varied depending on the reaction time at a predetermined reaction temperature. Accordingly, the components of Nd and Dy can be separated from an Fe component through the double sulfate precipitation resulting from the addition of the sodium sulfate.

Until now, although the method of recovering the rare earth element from oxidized scrap of a permanent magnet according to the embodiment of the present invention has been described in detail, it is obvious that various modifications may be made by those skilled in the art without departing from the scope of the present invention.

Therefore, it should be understood that the present invention is not limited to the embodiments described above. The scope of the present invention will be limited by the following appended claims as well as equivalents thereof.

In other words, those skilled in the art should comprehend that the above-described embodiments are provided for an illustrative purpose in all aspects, and not limited to the above description. The scope of the present invention is limited by appended claims instead of the detailed description. In addition, it will also be apparent to those skilled in the art that variations or modifications from the appended claims and the equivalent concept of the claims are included in the scope of the present invention.

What is claimed is:

1. A method of recovering a rare earth element from an oxidized scrap of a permanent magnet, the method comprising:
   leaching the oxidized scrap of the permanent magnet containing neodymium and dysprosium from a sulfuric acid solution;
   adjusting a weight ratio (Dy/Dy+Nd) of the leached neodymium and dysprosium existing in the sulfuric acid solution to 0.16; and
   recovering the neodymium and the dysprosium after precipitating the neodymium and the dysprosium by adding sodium sulfate into the sulfuric acid solution,
   wherein a reaction temperature in a range of 50° C. to 60° C. and a reaction time of three hours are maintained when the sodium sulfate is added, and
   wherein an amount of the sodium sulfate added into the sulfuric acid solution is 3.5 equivalent weights.

2. The method of claim 1, wherein the sulfuric acid solution has sulfuric acid concentration in a range of 0.05 M to 2.6 M.

3. The method of claim 1, wherein a content of the neodymium leached in the sulfuric acid solution is 2.3% by weight or more.

* * * * *